Dec. 31, 1935.   O. M. DRIESS   2,026,463
CONTAINER
Original Filed Feb. 11, 1935
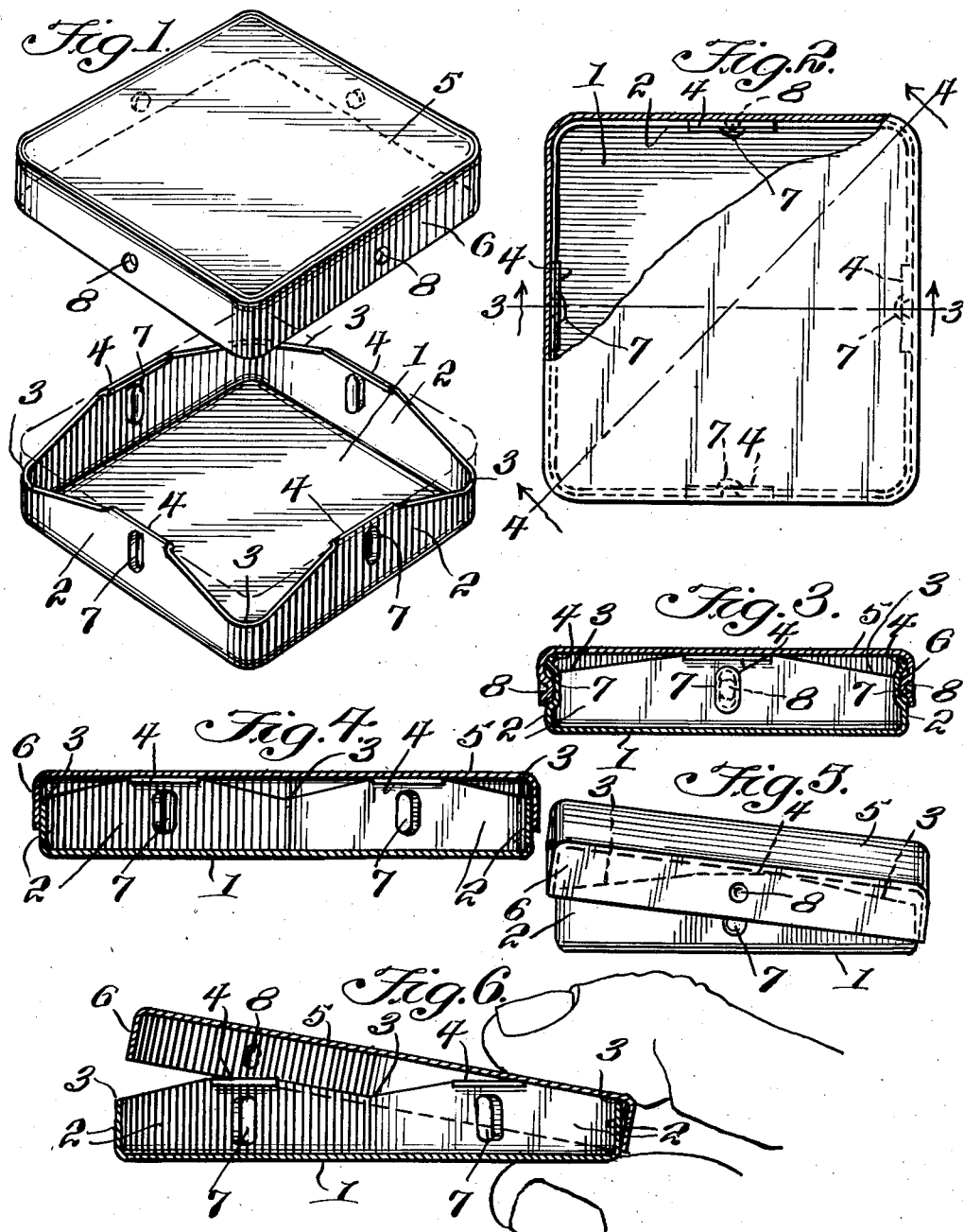
Oscar M. Driess
INVENTOR
BY Victor J. Evans & Co.
ATTORNEY Patented Dec. 31, 1935

2,026,463

UNITED STATES PATENT OFFICE 2,026,463

CONTAINER

Oscar M. Driess, Louisville, Ky., assignor of one-half to Horace H. Seay, Louisville, Ky.

Application February 11, 1935, Serial No. 6,056
Renewed August 1, 1935

5 Claims. (Cl. 220—43)

This invention relates to a container consisting of a receptacle and a closure or cover therefor, and has for the primary object the provision of a device of this character which will be easy and simple to open and obviates the danger of a person injuring or damaging the finger or fingernails when opening the receptacle, requiring only a slight pressure on the cover and the receptacle to bring about loosening of the cover from the receptacle.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a perspective view illustrating a container constructed in accordance with my invention and showing in full lines the cover removed from the receptacle.

Figure 2 is a top plan view, partly in section, illustrating the container.

Figure 3 is a sectional view taken on the line 3—3 of Figure 2.

Figure 4 is a sectional view taken on the line 4—4 of Figure 2.

Figure 5 is a side elevation illustrating the cover fulcruming on the receptacle when subjecting the cover and receptacle to a pressure.

Figure 6 is a sectional view showing the cover tilted upon the receptacle by a finger and a thumb of a person's hand.

Referring in detail to the drawing, the numeral 1 indicates a receptacle having upstanding walls 2 which may or may not be of integral construction with the bottom of the receptacle. The upper edges are cutaway in the direction of the corners, as shown at 3, providing a fulcrum or bearing portion 4 to each wall for a cover 5 to rest evenly upon when applied to the receptacle. It will be seen that the corners of the receptacle are of a much less height than the fulcrums 4 of the receptacle. The material of the walls at the fulcrums 4 is bent or curved inwardly to increase the width of the fulcrums for the cover 5 to engage.

The cover 5 is of the walled or flanged type, as shown at 6, the flanges fitting over the vertical walls of the receptacle when the cover is applied thereto and with the top wall of the cover resting upon the fulcrums.

Pressure applied to the receptacle and cover at any one of the corners, as shown in Figure 6, will cause the cover to tilt separating the cover from the receptacle at one side so that the cover may be easily removed.

Indentations 7 are formed in the vertical walls of the receptacle below the fulcrums 4 to receive teats or projections 8 formed on the cover aiding in retaining the cover on the receptacle and which will permit the cover to tilt on the fulcrums when the cover and receptacle are subjected to a pressure, as shown in Figure 6.

Having described the invention, I claim:

1. A container comprising a receptacle having upstanding walls with said walls cutaway to form fulcrums at their upper edges, and a flanged cover to close the receptacle with the flanges overlying the upstanding walls permitting the cover to rest upon the fulcrums whereby a pressure applied to the cover and receptacle laterally of any one of the fulcrums will bring about separation of the cover and receptacle at one side thereof, said upstanding walls of the receptacle having vertically arranged indentations disposed below the fulcrums and projections on the flanges of the cover extending into said indentations.

2. A container comprising a receptacle having upstanding walls, the said walls cut away to form fulcrums at their upper edges, and a flanged cover to close the receptacle with the flanges overlying the upstanding wall permitting the cover to rest upon the fulcrum whereby a pressure applied to the cover and receptacle laterally of any one of the fulcrums will bring about separation of the cover and receptacle at one side thereof, said upstanding walls of the receptacle and flanges being provided below said fulcrums with cooperating projections and indentations to form frictional locking means for the cover on said container.

3. A substantially rectangular container having the top edge of each of its side walls inclined toward the bottom in opposite directions from a part thereof between the ends of said wall, the said parts on all of said walls being substantially equidistant from said bottom to form a cover support and a cover seated on said parts and provided with flanges extending below each of said inclined edges when supported by said parts, said parts operating as fulcrums about which the cover pivots to separate the cover and container at one corner when pressure is applied to move the cover and container toward each other at the diagonally opposite corner.

4. A substantially rectangular container having the top edge of each of its side walls inclined toward the bottom in opposite directions from a part thereof between the ends of said wall, the said parts on all of said walls being substantially equidistant from said bottom to form a cover support and a cover seated on said parts and provided with flanges extending below each of said inclined edges when supported by said parts, said parts operating as fulcrums about which the cover pivots to separate the cover and container at one corner when pressure is applied to move the cover and container toward each other at the diagonally opposite corner, said sides and flanges being provided with cooperating projections and indentations below said parts to form frictional locking means for the cover on said container.

5. A substantially rectangular container having side walls substantially perpendicular to the bottom, the top edge of opposite side walls being inclined toward the bottom from a part of said edge between the opposite ends thereof, and a cover seated on said parts and provided with flanges extending below each of said inclined edges, said parts being parallel to said bottom and equidistantly spaced therefrom, and operating as fulcrums about which the cover pivots when pressure is applied to the cover adjacent the inclined parts of said top edges, said sides and flanges being provided with cooperating projections and indentations below said parts to form frictional locking means for the cover on said container.

OSCAR M. DRIESS.